United States Patent [19]
Marshall

[11] Patent Number: 6,144,484
[45] Date of Patent: *Nov. 7, 2000

[54] CW LASER AMPLIFIER

[75] Inventor: Larry R. Marshall, Mountain View, Calif.

[73] Assignee: Light Solutions Corporation, Mountain View, Calif.

[ * ] Notice: This patent is subject to a terminal disclaimer.

[21] Appl. No.: 09/468,419

[22] Filed: Dec. 20, 1999

Related U.S. Application Data

[63] Continuation of application No. 09/071,068, May 1, 1998.

[51] Int. Cl.$^7$ ...................................................... H01S 3/00
[52] U.S. Cl. ........................... 359/333; 359/342; 372/70; 372/71
[58] Field of Search .................................. 359/333, 342; 372/70, 71

[56] References Cited

U.S. PATENT DOCUMENTS

| | | | |
|---|---|---|---|
| 3,982,201 | 9/1976 | Rosenkrantz | 372/75 |
| 4,035,742 | 7/1977 | Schiffner | 331/94.5 |
| 4,272,733 | 6/1981 | Walling et al. | 372/41 |
| 4,383,318 | 5/1983 | Barry et al. | 372/6 |
| 4,553,238 | 11/1985 | Shaw et al. | 372/66 |
| 4,567,598 | 1/1986 | Noguchi et al. | 372/36 |
| 4,653,056 | 3/1987 | Baer et al. | 372/27 |
| 4,656,635 | 4/1987 | Baer et al. | 372/27 |
| 4,710,940 | 12/1987 | Sipes | 372/75 |
| 4,723,257 | 2/1988 | Baer et al. | 372/108 |

(List continued on next page.)

OTHER PUBLICATIONS

Anthon, D. et al.,"Stable Multilongitudinal–Mode Operation of a Diode–Pumped Twisted–Mode Intracavity Doubled Nd: YAG Laser", *CLEO'90*, Wednesday May 23, CWC3, pp. 232 (1990).

Baer, T.,"Large–Amplitude Fluctuations Due to Longitudinal Mode Coupling in Diode–Pumped Intractivity–Doubled Nd: YAG Lasers", *J. Opt. Soc. Am.*, vol. B3, pp. 1175–1180 (1986).

Beach, R. et al.,"Frequency Doubled Operation of a Ground State Depleted Laser Using the $Nd^{3+4}$ $F_{3/2}-^4/_{9/2}$ Transition in $Y_2SiO_5$", *CLEO'90*, Wednesday May 23, CWC6, pp. 234 (1990).

Berger, J. et al.,"Fiber Bundle Coupled, Diode End–Pumped Nd: YAG Laser", *Optics Letters*, vol. 13 (4), pp. 306–308 (1988).

Burnham, R. et al.,"High–Power Diode–Array–Pumped Frequency–Doubled cw Nd: YAG Laser", *Optics Letters*, vol. 14 (1), pp. 27–29 (1989).

(List continued on next page.)

*Primary Examiner*—Mark Hellner
*Attorney, Agent, or Firm*—Wilson Sonsini Goodrich & Rosati

[57] ABSTRACT

A solid state laser amplifier includes a diode pump source and a crystal capable of lasing light at a fundamental wavelength. The source is directed into the crystal, and a seed beam is also coupled along an input path into the crystal to initiate lasing, which amplifies the seed beam. The amplifier is intended for intermittent use, or use over a wide range of input power levels, so that variations of the energy input and output give rises to extreme thermal challenges. To manage heat stress in the amplifier crystal, both the pump beam and the seed beam are directed into the crystal through a cap of undoped material which is non-absorbent at the seed or pump wavelength, and is diffusion bonded to the crystal, thus serving as a thermal reservoir and allowing the laser to operate over a broad power band, with high gain over an extended range of saturation values, and to maintain stable operation during intermittent or changing operation of the seed laser. In a preferred embodiment the crystal is pumped from both ends by separate diode sources, with a continuous wave pump power of 10–40 W or more, and utilizes a vanadate crystal which lases at the band of a garnet or vanadate laser, providing a gain of two or more over an input seed beam power range from milliwatts to ten watts or more.

11 Claims, 3 Drawing Sheets

U.S. PATENT DOCUMENTS

| | | | |
|---|---|---|---|
| 4,805,177 | 2/1989 | Martin et al. | 372/34 |
| 4,847,851 | 7/1989 | Dixon | 372/75 |
| 4,884,277 | 11/1989 | Anthon et al. | 372/22 |
| 4,884,281 | 11/1989 | Hawthorn et al. | 372/75 |
| 4,887,270 | 12/1989 | Austin | 372/22 |
| 4,908,832 | 3/1990 | Baer | 372/75 |
| 5,022,042 | 6/1991 | Bradley | 372/75 |
| 5,181,211 | 1/1993 | Burnham et al. | 372/21 |
| 5,249,190 | 9/1993 | Kortz et al. | 372/22 |
| 5,446,749 | 8/1995 | Nighan, Jr, et al. | 372/22 |
| 5,511,085 | 4/1996 | Marshall | 372/22 |
| 5,521,932 | 5/1996 | Marshall | 372/36 |
| 5,663,979 | 9/1997 | Marshall | 372/103 |
| 5,717,517 | 2/1998 | Alfano et al. | 359/342 |
| 5,900,967 | 5/1999 | Zamel | 359/337 |

OTHER PUBLICATIONS

Chinn, S.,"Intractivity Second–Harmonic Generation in a Nd: Pentaphosphate Laser", *Applied Physics Letters*, vol. 29 (3), pp. 176–179 (1976).

Conant, L. et al.,"GaAs Laser Diode Pumped Nd: YAG Laser", *Applied Optics*, vol. 13 (11), pp. 2457–2480 (1974).

Cunningham, R.,"Adventures in the Blue and Green", *Lasers And Optronics*, pp. 31–33, Apr. (1994).

DiFonzo, S. et al.,"Laser Power Stabilization by Means of Internal Second Harmonic Generation", *Optics Communications*, vol. 71 (5), pp. 295–300 (1989).

Dixon, G.,"Frequency–Doubling Schemes Turn CW DPL's into Visible Sources", *Laser Focus World*, pp. 99–107 (1990).

Fan, T. et al.,"Diode Laser–Pumped Solid State Lasers", *IEEE Journal of Quantum Electronics*, vol. 24 (6), pp. 895–912 (1988).

Gerstenberger, D. et al.,"High Peak Power Operation of a Diode–Pumped Q–Switched Nd: YAG Laser", *Optics Letters*, vol. 15 (2), pp. 124–126 (1990).

Hanson, F. et al.,"Laser Diode Side Pumping of Neodymium Laser Rods", *Applied Optics*, vol. 27 (1), pp. 80–83 (1988).

Hong, J. et al.,"Diode Laser Array Pumped Q–Switched Nd: YAG Laser Operating at 946 nm", *CLEO'90*, Wednesday May 23, CWC7, pp. 234 (1990).

International Search Report, Issued Sep. 19, 1997 corresponding to PCT/US97/09601.

James, G. et al.,"Elimination of Chaos in an Intracavity–Doubled Nd: YAG Laser", *Optic Letters*, vol. 15 (20), pp. 1141–1143 (1990).

Jeys, T.,"Suppression of Laser Spiking by Intracavity Second Harmonic Generation", *Applied Optics*, vol. 30 (9), pp. 1011–1013 (1991).

Kasinski, J. et al.,"One Joule Output From a Diode–Array–Pumped Nd: YAG Laser with Side–Pumped Rod Geometry", *IEEE Journal of Quantum Electronics*, vol. 28 (4), pp. 977–985 (1992).

Kaz, A. et al.,"Continuous Wave Diode–Pumped Lasers and Parametric Oscillators", *CLEO'93*, Wednesday May 5, CWD1, pp. 244 (1993).

Keyes, R. et al.,"Injection Luminescent Pumping of $CaF_2:U^{3+}$ with GaAs Diode Lasers", *Applied Physics Letters*, vol. 4 (3), pp. 50–52 (1964).

Kintz, G. et al.,"Single–Frequency Operation in Solid–State Laser Materials with Short Absorption Depths", *IEEE Journal of Quantum Electronics*, vol. 26 (9), pp. 1457–1459 (1990).

Kubodera, K. et al.,"Pure Single–Mode $LiNdP_4O_{12}$ Solid–State Laser Transmitter for 1.3–$\mu$m Fiber–Optic Communications", *Applied Optics*, vol. 21 (19), pp. 3466–3469 (1982).

MacKinnon, N. et al.,"Ultra–Compact, Laser–Diode–Array–Pumped, $Nd:Yvo_4$/KTP, Frequency–Doubled, Composite–Material Microchip Laser", *CLEO'94*, Tuesday May 10, CtuP1, pp. 156 (1994).

Marshall, L. et al.,"Intracavity Doubled Mode–Locked and CW Diode–Pumped Lasers", *IEEE Journal of Quantum Electronics*, vol. 28 (4), pp. 1158–1163 (1992).

Marshall, L. et al.,"An Efficient Eyesafe Source at 1.59 Microns", *OSA Proceedings on Advanced Solid–State Lasers*, vol. 6, pp. 271–273 (1990).

Nightingale, J. et al.,"0.6 Stable, Single–Frequency, Green Laser", OSA *Proceedings of Compact Blue–Green Lasers Topical Meeting*, Feb. 10–11, Salt Lake City, UT, pp. PD61–PD64 (1994).

Oka, M. et al.,"Laser Diode Pumped 1–W Green Laser", *CLEO'90*, Wednesday May 23, CWC4, pp. 232–234 (1990).

Oka, M. et al.,"Stable Intracavity Doubling of Orthogonal Linearly Polarized Modes in Diode–Pumped Nd: YAG Lasers", *Optics Letters*, vol. 13 (10), pp. 805–807 (1988).

Pinto, J. et al.,"Suppression of Spiking Behavior in Flash-pumped 2–$\mu$m Lasers", *IEEE Journal of Quantum Electronics*, vol. 30 (1), pp. 167–169 (1994).

Product Literature for High Power Diode Lasers, Opto Power Corporation.

Product Literature for SDL 3400/6400/7400–P5/P6 Series, SDL Inc.

Rosenkrantz, L.,"GaAs Diode–Pumped Nd: YAG Laser", *Journal of Applied Physics*, vol. 43 (11), pp. 4603–4605 (1973).

Schutz, I. et al.,"Self–Frequency Doubling Nd: YAB Laser Pumped by a Diode Laser", *CLEO'90*, Wednesday May 23, CWC4, pp. 232 (1990).

Smith, R. et al.,"100 mW Laser Diode Pumped Nd: YAG Laser", *SPIE Advances in Laser Engineering and Applications*, vol. 247, pp. 144–148 (1980).

Taira, T. et al.,"Single–Mode Oscillation of Laser–Diode–Pumped Nd: $YVO_4$ Microchip Lasers", *Optics Letters*, vol. 16 (24), pp. 1955–1957 (1991).

Zhou, B. et al.,"Efficient, Frequency–Stable Laser–Diode–Pumped Nd: YAG Laser", *Optics Letters*, vol. 10 (2), pp. 62–64 (1985).

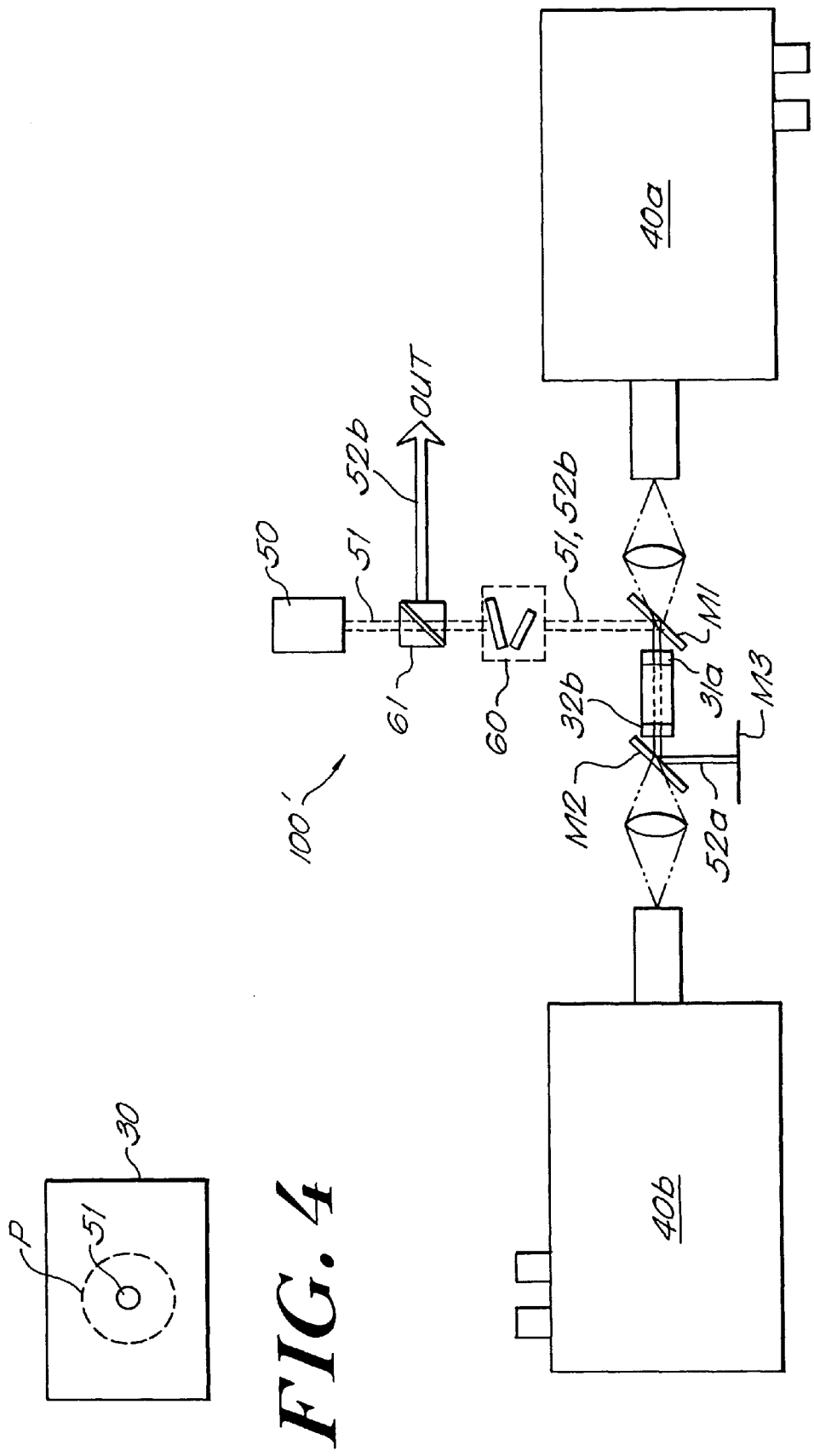

ical Field

The present invention relates to laser amplifiers, and in particular to a solid state continuous wave laser amplifier.

SUMMARY OF THE INVENTION

The present invention is a solid state laser amplifier. The amplifier includes a laser crystal which is capable of being pumped to produce laser light at a fundamental wavelength, and a diode pump source which is directed into the laser crystal. A coupler receives a seed beam and directs it into the crystal along an input path to initiate lasing which amplifies the seed beam. Both the pump beam and the seed beam are directed into the crystal through a cap of material which is diffusion bonded to the crystal and which is undoped, and does not absorb energy at the pump wavelength. The cap serves as a thermal reservoir and reduces heat stress of the laser crystal during varying cycles of operation. This allows the laser to operate over a broad power band, with high gain over an extended range of saturation values, and maintain stable operation during intermittent operation of the seed laser. By alleviating thermal excursions, it also allows more stable operation with a crystal having small dimension, higher doping concentration, or both.

In a preferred embodiment the crystal is pumped from both ends by separate diode sources, with a continuous wave pump power of ten to forty watts or more, and the amplifier utilizes a vanadate crystal which lases at the band of a garnet (e.g. YAG) or $YVO_4$ laser. The system so configured may provide a gain of two or more over an input seed beam power range from milliwatts to ten watts or more. The amplifier may operate as a single-pass amplifier, with direct output of the amplified beam, or it may employ a return mirror which reflects the amplified beam back into the crystal to provide increased gain. When used with a return mirror, the output beam may be separated from the path, e.g., blocked from reaching the input laser, by a polarization coupling assembly, such as a Faraday rotator and polarization beam splitter.

Preferably the pump source utilizes a packaged diode array having bundled diode outputs that provide a high power but relatively poor quality beam, with a power in the range of two to thirty watts. This beam is directed by one or more relay lenses into the crystal, and the seed beam is coupled centrally along the input path, inside the pump mode volume, so that an amplified beam of higher quality is produced. The amplifier is a simple and effective unit to upgrade an existing piece of equipment, such as a lower power or a prior generation YAG laser or medical laser console, of the type common for an ophthalmic or dermatologic clinical laser system This essentially multiplies its available power while allowing the console to operate with its existing pulse selection, power stabilization, and sequencing control circuitry.

BRIEF DESCRIPTION OF THE DRAWINGS

These and other desirable features will be understood from the discussion below of representative embodiments and principles of operation, together with the drawings of several illustrative systems and details thereof, wherein.

FIG. 3A illustrates a multi-pass embodiment of the invention; and

FIG. 4 illustrates details of the crystal in systems of the invention.

DETAILED DESCRIPTION

Figure 1:
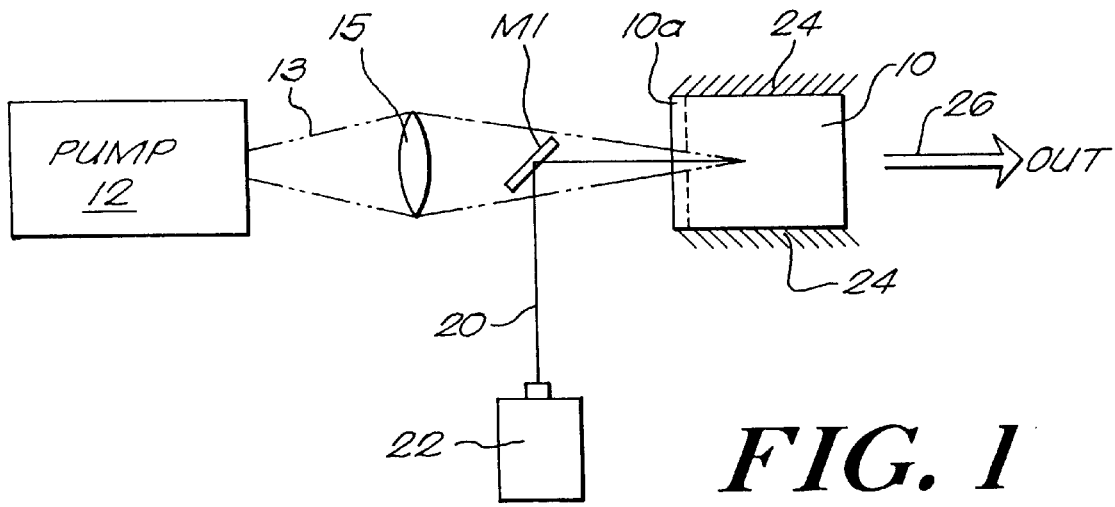
FIG. 1 shows one embodiment of the invention.

FIG. 1 shows a basic embodiment of the invention wherein a laser crystal 10 is set up to be pumped by a diode pump source 12 of which the output beam 13 is focused or relayed by a relay lens 15 into the crystal. A turning mirror M1, which is transmissive at the pump wavelength and has a lower side that reflects the fundamental wavelength, is positioned in front of the crystal 10 and receives an input or seed beam 20 at the fundamental wavelength from a laser source 22 which may, for example, be a pulsed laser of the type commonly employed for clinical treatment procedures. The crystal 10 may, for example, be a vanadate crystal which lases at about 0.1 micrometer, while the diode pump source may be an 808 nanometer source operating at about ten to thirty watts power level. Opposed sides of the crystal 10 are heat sunk by heat sink 24. The pump beam is ON continuously, and produces a high population of excited states in the crystal so the crystal lases when the seed beam is introduced and produces an amplified output beam 26. Thus, in this embodiment, the device operates as a single-pass amplifier in which the diode source provides an excited population and the seed beam achieves the threshold necessary for lasing activity. The vanadate crystal may be a small crystal, for example, a block 3×3×4 millimeters. In accordance with a pricipal aspect of the invention, the crystal 10 has an end cap 10*a* on its pumped end.

The end cap 10*a* is formed of essentially the same material as the laser crystal itself but is undoped, or doped to a much lower level, so that very little or none of the 808 nm pump light is absorbed in the end cap itself. The end cap is diffusion-bonded to the rest of the crystal. This is done by polishing both the end cap and the crystal end optically smooth and flat and placing the cap onto the end of the crystal, preferably also applying at least one of an elevated pressure or heat for a sufficient time to create a unified junction between the two pieces. This provides a single crystal body, which is free of extraneous internal reflective of diffractive boundaries or artifacts, yet in which the heat of absorption is generated substantially only in the doped, absorbing portion of the crystal away from the end, while in other respects the entire body of the crystal acts as a homogeneous crystal. As a result, the mechanism of heat generation, which is localized, is tempered by conductive cooling from a portion which extends further outside of the heated region.

Figure 2:
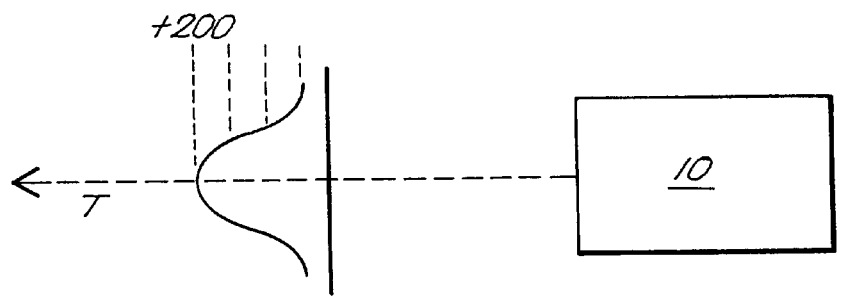
FIGS. 2 and 2A show representative heat distributions of the prior art and of the invention.

FIG. 2 illustrates a representative shape of the heat distribution over the cross-section of a laser crystal which would occur during diode pumping. The pump light is directed centrally into the crystal, and heat builds up near the center while the edges remain cooled by the heat sink, such as sink 24. In typical operation, when the seed laser is turned on, its power is amplified, for an example, by a factor of about two, and energy is coupled out of the crystal.

When the seed laser has a relatively high power level, such as a ten watt pulse, then the amplification couples a comparable amount of energy, which had been absorbed from the pump light, out of the crystal, and the heat economy of the crystal is relatively manageable. On the other hand, when the seed beam is of low duty cycle or power, such as a 100 mW level, or when the seed laser is turned OFF, then substantially all of the pump energy ccontinues to be absorbed in the crystal without any quick energy loss mechanism being active, and the crystal temperature starts to climb quite rapidly. As shown in FIG. 2, under these circumstances the temperature in the center of the crystal may rise to several hundred degrees higher than at the edges.

Figure 2A:
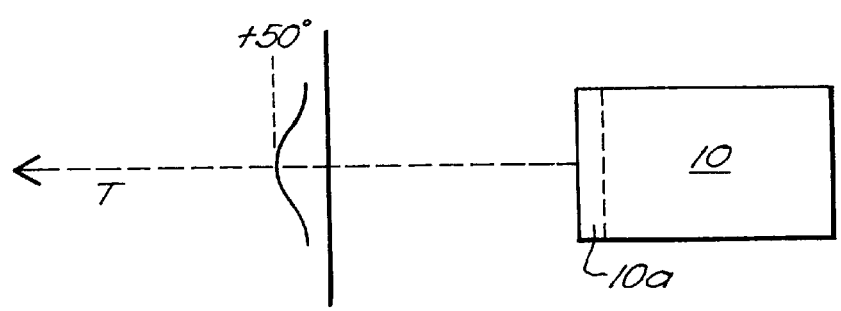

FIG. 2A is a view similar to FIG. 2 showing the form of resulting temperature distribution under zero or low-input conditions of the crystal in accordance with the present invention, having an end cap 10a positioned on the crystal 10. Since the material of crystal end 10a does not absorb pump radiation, hence does not heat up internally, this material operates as a passive thermal reservoir to conduct heat out of the crystal 10 across the plane of the actively doped end portion of the crystal. This maintains the interior temperature of the lasing portion of the crystal at a level substantially below that of the bare (uncapped) crystal (FIG. 2), and flattens the thermal gradient across the thickness dimension of the crystal in the region where the highest pump absorption occurs. The effect is quite pronounced since the crystal 10 is preferably highly doped, e.g., doped to a level sufficient to absorb the pump light in a single pass, and therefore has a relatively short extinction path length.

Figure 3:
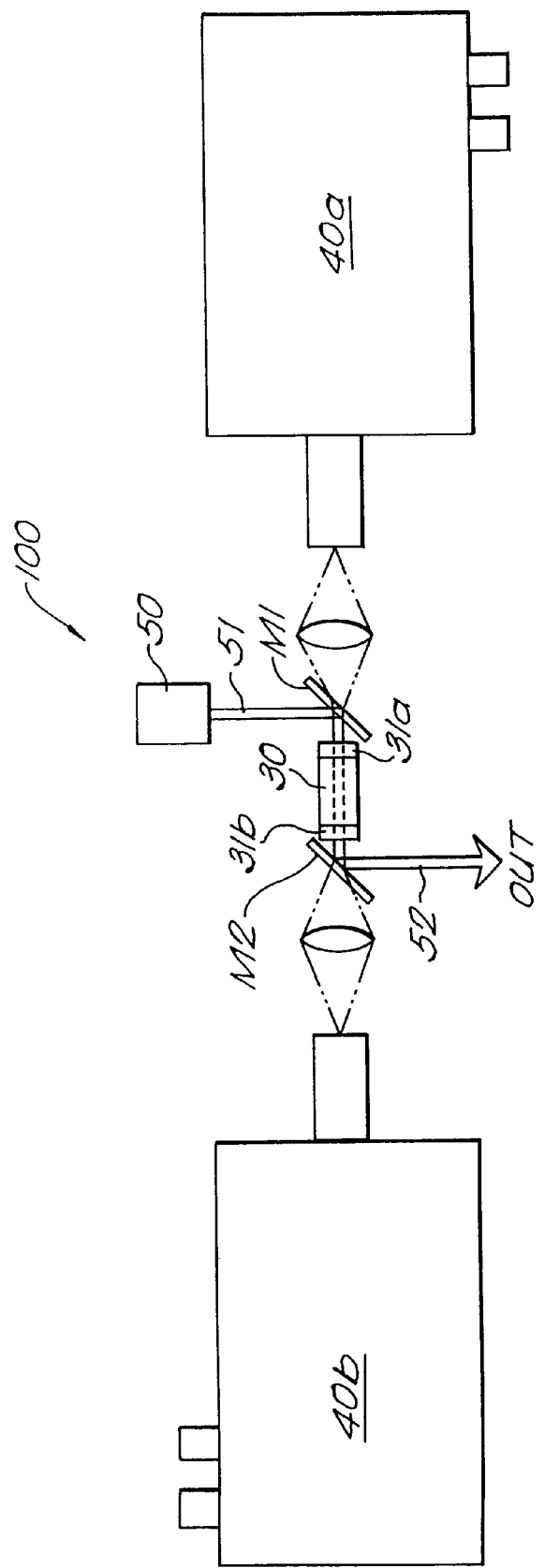
FIG. 3 illustrates another embodiment of the invention.

FIG. 3 illustrates a presently preferred embodiment of a laser amplifier 100 in accordance with the present invention. Laser 100 in this embodiment employs a laser crystal 30 which is pumped by two diode sources 40a and 40b, one pumping each end of the crystal. Each of the sources 40a and 40b may, for example, have an output power of approximately twenty or thirty watts at 808 nanometers, so that substantial pump power is placed into the crystal. As before, an input laser 50 projects its beam 51 along an input path into the crystal 30. In the illustrated embodiment, beam 51 is coupled by a first folding mirror M1, which is completely transmissive at the pump wave length and completely reflective at the input (seed) wave length. At the other end of the crystal, a similar mirror M2 having its upper surface refective at the seed wavelength, couples the amplified beam out of the system as an output beam 52. Just as for the basic embodiment described above, the doubling crystal 30 has an end cap 31a on its input end at the right side) and an end cap 31b on the left end of the crystal which is pumped by source 40b, and these end caps are formed of a non-pump absorbing, undoped material, and are diffusion-bonded to the respective crystal faces.

In many respects, this architecture and layout are similar to the diode pumped lasers described in Applicants' U.S. patent application 5,663,979, and particularly to the systems shown in FIGS. 16–21 thereof, wherein diode array packages pump a crystal from one or both ends via relay lenses which allow a placement of one or more turning mirrors for providing return, input, or output paths for the active components. In addition, this construction advantageously utilizes the heat sinking arrangements described in commonly-owned U.S. patent application Ser. No. 08/865,508 filed May 30, 1997, wherein the heat sinks are operated, optionally with dynamic control keyed to the prior and/or next activation, to maintain an isotherm in the mode volume. The full disclosures of the foregoing patents and the foregoing patent application are hereby incorporated herein by reference.

Returning now to a discussion of FIG. 3, the figure also shows end caps 31a, 31b on the crystal 30, which as noted above are non-absorbing at the pump wavelength, and are diffusion-bonded (sometimes referred to as optically-contact bonded) to the crystal 30 to serve as passive thermal reservoirs to supplement the conductive cooling pathways of the laser without complicating its heat generation, and thus prevent extreme temperature excursions of the crystal. As noted above, preferably the crystal 30 has heat sinks at opposed sides, e.g., the top and bottom of a rectangular brick, or circumferentially surrounding a rod, and these heat sinks may advantageously extend similarly over the sides of the end caps. In the latter case, the supplemental cooling is actively increased with the heat sinks, while subject to a smoothing delay due to conduction through the caps.

While the amplifier 100 of FIG. 3 operates in a single-pass from the input 51 to the output 52, the invention also contemplates a multipass construction. In one such construction, a return mirror is provided to reflect beam 52 back through the crystal, thereby increasing the efficiency of the amplification process. Such a system is indicated in FIG. 3A. In this system, the first-pass amplified beam 52 passes through the crystal 30, and is directed to a mirror M3 which reflects the beam back into the crystal where it undergoes further amplification and is directed out along the input path 51 as an enhanced amplified beam 52b. A Faraday rotation isolator 60 is placed in the path, which allows the input beam 51 to enter the amplifier while blocking all but a defined polarization of the return beam 52b. Beam 52b is coupled out from the path by a polarization beam splitter 64 placed ahead of the source, thus separating the amplified output beam 52b along a distinct output path. With this construction, using diode arrays or packages 40a, 40b, each having a power of about twenty or thirty Watts, the laser crystal is capable of amplifying input seed beams over a broad range of power levels with fairly uniform gain. Thus, for example, a 100 milliwatt seed beam is amplified to a 200 milliwatt output beam, while a 10 or 20 watt seed beam may be amplified by a factor of 1.5–2, the gain being slightly lower at higher input powers due to the increased saturation of the amplifier. As noted above however, when the seed beam is of low power, then a correspondingly greater portion of the pump beam is being absorbed in the crystal and the energy is not removed in the form of amplified output. For this reason, the presence of the end caps becomes critical for avoiding sharp fluctuations in the temperature of the crystal, or degradation of the beam quality or amplifier gain.

FIG. 4 further illustrates a preferred arrangement of the seed and pump beams in the amplifier of any of the foregoing figures. As shown in FIG. 4, the cross-section of the crystal 30 as viewed from the end is centrally pumped from the diode source with a pumped mode volume P. The input mirror M1 directs the input beam 51 centrally within the area P so that the amplified beam occupies a smaller volume, resulting in a cleaner output. Similarly, the mirror M3 of FIG. 3A may, for example, be a focusing or slightly concave return mirror which focuses the output beam centrally within the corresponding pumped region at the other end of the crystal. As will be readily understood, it is also not necessary to utilize both mirrors M2, M3 in the two-pass embodiment of FIG. 3A; these may be replaced by a single mirror M4 (not shown) placed across the beam axis.

In all of the foregoing constructions, the crystal 30 is capable of lasing at the wave length of the input source 50 so that for example both may be YAG laser crystals. However, preferably, the crystal 30 is a yttrium vanadate crystal which has a broad lasing band which operates effectively with either YAG or vanadate laser sources. In practical embodiments of the system, all elements except for the source 50 may be assembled as a single unit having an input port which may, for example, accept a standard type of optical fiber connector, and having an output port for delivering the beam 52*b,* as well as a simple power line connection for powering the pump source, and possibly cooling arrangements, if an external cooler or plumbing is to be used. In this case, the input beam 51 provided by separate input laser 50 may simply connect to a common input port of the assembly so that the assembly is readily adapted for working with any existing pulsed or continuous operation laser system of the appropriate wave length.

The foregoing illustrations of amplifying architecture are intended as illustrative of the principle of the invention. However, the invention in its broadest aspect, using a laser crystal having uniform thermal transfer and structural/mechanical characteristics, but a stepped doping profile, will find may uses in lasers, amplifiers and doublers, allowing coupling between optically active elements that reduces the constraints on associated doping levels, coupling parameters, and requisite thermal control systems. The invention being thus disclosed, variations and modifications will occur to those skilled in the art, and all such variations and modifications are considered to lie within the scope of the invention as defined by the claims appended hereto.

What is claimed is:

1. A continuous wave laser amplifier, comprising
   a pump source for emitting laser light at a pump wavelength $\lambda_p$, a crystal placed in a laser cavity and configured to emit laser light at an output wavelength $\lambda_o$, said laser light of said pump source being directed into the crystal,
   at least one optical element position to couple a laser seed beam along an input path into the crystal so that the crystal amplifies power of the laser seed beam into an amplified beam at said output wavelength $\lambda_p$,
   an output coupler for coupling at least a portion of said amplified beam out of the cavity thereby removing energy, and
   wherein said crystal includes an end of non-lasing material forming a passive thermal reservoir to stabilize operation when output power is low, thereby preventing overheating and crystal damage.

2. A continuous wave laser amplifier according to claim 1 wherein the pump source is a diode source which includes a first laser diode array arranged to pump a first end of the crystal, and a second laser diode array arranged to pump a second end of the crystal, and wherein each of said first and said second ends are formed of non-lasing material.

3. A continuous wave laser amplifier according to claim 1 wherein said non-lasing material is diffusion-bonded to said crystal.

4. A continuous wave laser amplifier according to claim 3, wherein said pump source pumps a mode volume, and said seed beam is coupled into a subregion of the mode volume.

5. A continuous wave laser amplifier according to claim 3, wherein said crystal is a vanadate crystal.

6. A continuous wave laser amplifier according to claim 2, wherein the first and second ends have end caps formed of undoped crystal material which are diffusion bonded to a central block of doped crystal material to form said crystal, and said crystal amplifies a 1.06$\mu$ seed beam.

7. A continuous wave laser amplifier according to claim 6, wherein said amplified beam is output coupled along an output beam path by oblique reflection from a mirror.

8. A continuous wave laser amplifier according to claim 6, further comprising a cooling member to cool the crystal and the end caps.

9. A continuous wave laser amplifier according to claim 1, further comprising a return mirror for directing said amplified beam back though the crystal to form a multipass amplified beam, and further comprising an output selector for blocking the multipass amplified beam from the input path and selectively directing it to an output path.

10. A continuous wave laser amplifier according to claim 9, wherein the output selector comprises a Faraday rotator and a polarization beam splitter.

11. A continuous wave laser amplifier, comprising
    a pump source for emitting laser light at a pump wavelength $\lambda_p$,
    a crystal having an end formed of non-lasing material positioned to receive said laser light of said pump source, said crystal being configured to emit laser light at an output wavelength $\lambda_o$, said non-lasing material forming a passive thermal reservoir to stabilize operation of the amplifier when output power is low, and
    a laser seed beam coupled along an input path into the crystal so that the crystal amplifies power of the laser seed beam into an amplified beam at said output wavelength $\lambda_o$.

* * * * *